US012577102B2

(12) United States Patent
Li et al.

(10) Patent No.: US 12,577,102 B2
(45) Date of Patent: Mar. 17, 2026

(54) METHOD FOR PREPARING HIGH-PURITY LITHIUM SULFIDE BY USING INDUSTRIAL-GRADE BUTYLLITHIUM

(71) Applicant: JIANGXI GANFENG LITHIUM INDUSTRY CO., LTD., Xinyu (CN)

(72) Inventors: Liangbin Li, Xinyu (CN); Cui Liao, Xinyu (CN); Ming Ye, Xinyu (CN); Zhihua Hu, Xinyu (CN); Zhifang Pan, Xinyu (CN); Bin Hu, Xinyu (CN); Jianyong Zhang, Xinyu (CN); Zhong Hu, Xinyu (CN); Maonv Liao, Xinyu (CN)

(73) Assignee: JIANGXI GANFENG LITHIUM INDUSTRY CO., LTD., Xinyu (CN)

( * ) Notice: Subject to any disclaimer, the term of this patent is extended or adjusted under 35 U.S.C. 154(b) by 453 days.

(21) Appl. No.: 18/025,914

(22) PCT Filed: Feb. 21, 2022

(86) PCT No.: PCT/CN2022/076981
§ 371 (c)(1),
(2) Date: Mar. 13, 2023

(87) PCT Pub. No.: WO2022/144038
PCT Pub. Date: Jul. 7, 2022

(65) Prior Publication Data
US 2023/0365408 A1     Nov. 16, 2023

(30) Foreign Application Priority Data
Dec. 31, 2020     (CN) ........................ 202011615320.X

(51) Int. Cl.
| | |
|---|---|
| *C01B 17/28* | (2006.01) |
| *B82Y 30/00* | (2011.01) |
| *B82Y 40/00* | (2011.01) |
| *C01B 17/22* | (2006.01) |
| *C01B 17/36* | (2006.01) |
| *C01B 17/38* | (2006.01) |
| *H01M 10/0525* | (2010.01) |
| *H01M 10/0562* | (2010.01) |

(52) U.S. Cl.
CPC .............. *C01B 17/28* (2013.01); *C01B 17/36* (2013.01); *C01B 17/38* (2013.01); *C01P 2006/82* (2013.01)

(58) Field of Classification Search
CPC ......... C01B 17/28; C01B 17/36; C01B 17/38; C01B 17/22
See application file for complete search history.

(56) References Cited

U.S. PATENT DOCUMENTS

| | | | | | |
|---|---|---|---|---|---|
| 3,642,436 | A | * | 2/1972 | Smith, Jr. ............... | C01B 17/22 |
| | | | | | 423/566.2 |
| 2007/0196739 | A1 | * | 8/2007 | Seino ................ | H01M 10/0562 |
| | | | | | 423/566.2 |
| 2014/0084224 | A1 | * | 3/2014 | Rittmeyer ........... | H01M 4/5815 |
| | | | | | 423/511 |

FOREIGN PATENT DOCUMENTS

| | | | |
|---|---|---|---|
| CN | 1871177 | A | 11/2006 |
| CN | 103813980 | A | 5/2014 |
| CN | 105016310 | A | 11/2015 |
| CN | 109019526 | A | 12/2018 |
| CN | 111017966 | A | 4/2020 |
| CN | 111517288 | A | 8/2020 |
| CN | 112624060 | A | 4/2021 |

* cited by examiner

*Primary Examiner* — Yong L Chu
(74) *Attorney, Agent, or Firm* — HOWARD M COHN and Associates, LLC

(57)     ABSTRACT

A method for preparing high-purity lithium sulfide by using industrial-grade butyllithium includes the following steps: step A: under an inert gas condition, thoroughly mixing 1.5-2.5 g of lithium chloride, 0.5 L of an industrial-grade n-butyllithium solution (2.5 mol/L) and 1.5-2.5 L of n-hexane to obtain a mixed solution, and charging the mixed solution into a sealed container; step B: under the sealed condition, firstly introducing $H_2S$ gas into a gas-washing bottle through a submerged pipe at a rate of 10.5 L/h, then introducing into the mixed solution through the submerged pipe, controlling the reaction temperature at 25-40° C., and continuously stirring for reaction for 4-6 h to obtain a reaction slurry; and step C: under an inert gas condition, filtering the reaction slurry with a G3 sand core funnel to obtain a crude lithium sulfide solid wet material.

6 Claims, No Drawings

METHOD FOR PREPARING HIGH-PURITY LITHIUM SULFIDE BY USING INDUSTRIAL-GRADE BUTYLLITHIUM

CROSS REFERENCE TO THE RELATED APPLICATIONS

This application is the national phase entry of International Application No. PCT/CN2022/076981, filed on Feb. 21, 2022, which is based upon and claims priority to Chinese Patent Application No. 202011615320.X, filed on Dec. 31, 2020, the entire contents of which are incorporated herein by reference.

TECHNICAL FIELD

The present invention relates to a method for preparing high-purity lithium sulfide by using industrial-grade butyllithium.

BACKGROUND

Lithium sulfide is one of the potential glassy solid electrolyte raw materials in all-solid-state lithium-ion batteries. Sulfide electrolytes prepared from lithium sulfide are currently the most conductive class of solid-state electrolytes, which have a conductivity reaching $10^{-4}$-$10^{-3}$ S/cm at room temperature and an electrochemical window above 5 V, and therefore have good application prospects in lithium-ion batteries.

At present, the main methods for synthesizing lithium sulfide are divided into two specific types, one of which is to prepare lithium sulfide by one or more lithium-containing compounds and elemental sulfur at a temperature of 600-1500° C. This type of method comprises simple experimental procedures, but has the defects that the reaction needs to be carried out under high temperature, non-oxidizing atmosphere or reduction conditions and the lithium polysulfide is easy to generate. It requires harsh experimental conditions, and therefore is not conducive to large-scale production. Another type is to directly react lithium hydroxide and hydrogen sulfide in an aprotic organic solvent to obtain lithium sulfide, wherein a mixture of lithium sulfide ($Li_2S$) and lithium hydrosulfide (LiHS) is produced in the reaction, and the water produced in the reaction will also affect the quality and purity of lithium sulfide.

SUMMARY

Based on the above, it is necessary to provide a method for preparing high-purity lithium sulfide by using industrial-grade butyllithium to address the above-mentioned problems. The prepared lithium sulfide has high purity (≥99.9%), uniform particle size and high crystallinity.

In order to achieve the above-mentioned objective, the present invention provides the following technical solutions.

Provided is a method for preparing high-purity lithium sulfide by using industrial-grade butyllithium, comprising the following steps:

step A: under an inert gas condition, thoroughly mixing 1.5-2.5 g of lithium chloride, 0.5 L of an industrial-grade n-butyllithium solution (2.5 mol/L) and 1.5-2.5 L of n-hexane to obtain a mixed solution, and charging the obtained mixed solution into a sealed container;

step B: under the sealed condition, firstly introducing $H_2S$ gas into a gas-washing bottle through a submerged pipe at a rate of 10.5 L/h, then introducing into the mixed solution obtained in step A through the submerged pipe, controlling the reaction temperature at 25-40° C., and continuously stirring for reaction for 4-6 h to obtain a reaction slurry;

step C: under an inert gas condition, filtering the slurry obtained by the reaction in step B above with a G3 sand core funnel to obtain a crude lithium sulfide solid wet material, and rinsing the crude lithium sulfide wet material three times with 0.5 L of dehydrated n-hexane;

step D: under an inert gas condition, adding 0.5-1 L of pre-dehydrated NMP to the rinsed lithium sulfide wet material obtained in step C above, stirring for 1-2 h, and then filtering with a G3 sand core funnel to obtain a refined lithium sulfide wet material;

step E: placing the refined lithium sulfide wet material obtained in step D into a vacuum drying oven, drying in vacuum at 205° C. for 8 h to obtain dried lithium sulfide;

step F: placing the dried lithium sulfide obtained in step E into a vacuum-sealed stainless steel device, vacuumizing the device, placing the device into an atmosphere furnace at 550° C. followed by heat preservation for 2-4 h under an inert gas protection, and then naturally cooling to obtain high-purity lithium sulfide; and step G: crushing the high-purity lithium sulfide obtained after the heat treatment in step F above at 2000 r/min under an inert gas protection for 1-2 min to obtain a white anhydrous lithium sulfide powder, and performing vacuum packaging.

Further, in step A, the butyllithium added is of industrial grade and has a concentration of 2.5 mol/L, and the n-hexane and the butyllithium are added in a volume ratio of (3-5):1.

Further, in step B, $H_2S$ gas needs to be firstly introduced into the gas-washing bottle for purification, wherein the gas-washing bottle is charged with a mixed solution of lithium sulfide and n-hexane, and $H_2S$ gas is introduced at a rate of 10.5 L/h.

Further, in step C, the n-hexane used for rinsing needs to be subjected to a dehydration treatment in advance, the dehydrated n-hexane has a moisture content of ≤50 ppm, and the n-hexane and the butyllithium are used in a volume ratio of 1:1.

Further, in step D, the NMP used for dissolution needs to be subjected to a dehydration treatment, the dehydrated NMP has a moisture content of ≤100 ppm, and the NMP and the butyllithium are used in a volume ratio of (1-2):1.

Further, the inert gas in step E and step F is argon or nitrogen.

Compared with the prior art, the method for preparing high-purity lithium sulfide by using industrial-grade butyllithium disclosed herein is characterized in that the industrial-grade butyllithium is reacted with hydrogen sulfide in an n-hexane solution at a temperature of 25-40° C. under an inert condition. Lithium sulfide is precipitated as a white solid and separated by filtration and drying after the reaction is completed. No water and impurities are introduced in the whole reaction, and finally high-purity lithium sulfide can be obtained. The equation for the synthesis is as follows: $H_2S + 2C_4H_9Li \rightarrow Li_2S + 2C_4H_{10}$.

The method for preparing high-purity lithium sulfide by using industrial-grade butyllithium disclosed herein is characterized in that the obtained lithium sulfide has less impurities, high purity, small particle size of about 100 nm, and high crystallinity. The sulfide electrolyte prepared from the obtained lithium sulfide has a conductivity reaching the level of $10^{-3}$ S/cm, so it reaches the level of liquid commercial electrolyte and has good application prospects.

DETAILED DESCRIPTION OF THE EMBODIMENTS

The present invention provides a method for preparing high-purity lithium sulfide by using industrial-grade butyl-lithium, comprising the following steps:

step A (solution mixing): under an inert gas condition, thoroughly mixing 1.5-2.5 g of lithium chloride, 0.5 L of an industrial-grade n-butyllithium solution (2.5 mol/L) and 1.5-2.5 L of n-hexane to obtain a mixed solution, and charging the obtained mixed solution into a sealed container;

step B (gas-liquid reaction): under the sealed condition, firstly introducing $H_2S$ gas into a gas-washing bottle through a submerged pipe at a certain rate (10.5 L/h), then introducing into the mixed solution obtained in step A through the submerged pipe, controlling the reaction temperature at 25-40° C., and continuously stirring for reaction for 4-6 h to obtain a reaction slurry;

step C (filtering and rinsing): under an inert gas condition, filtering the slurry obtained by the reaction in step B above with a G3 sand core funnel to obtain a crude lithium sulfide solid wet material, and rinsing the crude lithium sulfide wet material three times with 0.5 L of dehydrated n-hexane;

step D (dissolution and filtration): under an inert gas condition, adding 0.5-1 L of pre-dehydrated NMP to the rinsed lithium sulfide wet material obtained in step C above, stirring for 1-2 h, and then filtering with a G3 sand core funnel to obtain a refined lithium sulfide wet material;

step E (vacuum drying): placing the refined lithium sulfide wet material obtained in step D into a vacuum drying oven, drying in vacuum at 205° C. for 8 h to obtain dried lithium sulfide;

step F (heat treatment): placing the dried lithium sulfide obtained in step E into a vacuum-sealed stainless steel device, vacuumizing the device, placing the device into an atmosphere furnace at 550° C. followed by heat preservation for 2-4 h under an inert gas protection, and then naturally cooling to obtain high-purity lithium sulfide; and step G (crushing and packaging): crushing the high-purity lithium sulfide obtained after the heat treatment in step F above at 2000 r/min under an inert gas protection for 1-2 min to obtain a white anhydrous lithium sulfide powder, and then performing vacuum packaging.

Further, in step A, the butyllithium added is of industrial grade and has a concentration of 2.5 mol/L, and the n-hexane and the butyllithium are added in a volume ratio of (3-5):1.

Further, in step B, $H_2S$ gas needs to be firstly introduced into the gas-washing bottle for purification, wherein the gas-washing bottle is charged with a mixed solution of lithium sulfide and n-hexane, and $H_2S$ gas is introduced at a rate of 10.5 L/h to ensure the stability of the reaction and prevent too fast gas introduction which will cause most of the $H_2S$ to remain unreacted. Meanwhile, the reaction can be prevented from being too fast, thereby avoiding the situation that the temperature of the system changes greatly due to the release of a large amount of heat.

Further, in step C, the n-hexane used for rinsing needs to be subjected to a dehydration treatment in advance, the dehydrated n-hexane has a moisture content of ≤50 ppm, and the n-hexane and the butyllithium are used in a volume ratio of 1:1.

Further, in step D, the NMP used for dissolution needs to be subjected to a dehydration treatment, the dehydrated NMP has a moisture content of ≤100 ppm, and the NMP and the butyllithium are used in a volume ratio of (1-2):1.

Further, the inert gas in step E and step F is argon or nitrogen.

The method for preparing high-purity lithium sulfide disclosed herein may be further characterized in that: in step A, the purpose of adding lithium chloride is to prevent lithium sulfide produced in the reaction of butyllithium with $H_2S$ from pseudo thickening, which will cause difficulty in stirring and non-uniform reaction. In step B, the main substance in the gas-washing bottle is a mixture of n-hexane and lithium sulfide, with a solid-to-liquid ratio of 1:5-1:10. In step B, the determination of reaction end point is conducted as follows: after reacting for 4-6 h, 3-5 mL of the reaction slurry is taken under an inert gas condition, and 30-50 mL of n-hexane is added; the resulting mixture is homogeneously stirred and filtered with a G4 sand core funnel, and then phenolphthalein and a small amount of water are dropwise added to the obtained solution; if the solution does not change color, it means that the reaction is completed.

Example 1

Step A (solution mixing): Under an inert gas condition, 1.5 g of lithium chloride, 0.5 L of an n-butyllithium solution (2.5 mol/L) and 1.5 L of n-hexane were thoroughly mixed to obtain a mixed solution, and the obtained mixed solution was charged into a sealed container.

Step B (gas-liquid reaction): Under the sealed condition and at a temperature of 25° C., $H_2S$ gas was firstly introduced into a gas-washing bottle through a submerged pipe at a certain rate (10.5 L/h), and then introduced into the mixed solution through the submerged pipe. The resulting mixture was continuously stirred for reaction for 4 h, so that a reaction slurry was obtained.

Step C (filtering and rinsing): Under an inert gas condition, the slurry which was completely reacted was filtered with a G3 sand core funnel, and the crude lithium sulfide wet material was rinsed three times with 0.5 L of dehydrated n-hexane.

Step D (dissolution and filtration): Under an inert gas condition, the upper slurry was taken out, and 0.5 L of pre-dehydrated NMP was added. The resulting mixture was stirred for 2 h, and then filtered with a G4 sand core funnel to obtain a refined lithium sulfide wet material.

Step E (vacuum drying): The obtained refined lithium sulfide wet material was placed into a vacuum drying oven and dried at 205° C. for 8 h. Finally, dried lithium sulfide was obtained.

Step F (heat treatment): The obtained dried lithium sulfide was placed into a vacuum-sealed stainless steel device. The device was vacuumized, and then placed into an atmosphere furnace at 550° C. followed by heat preservation for 2 h under an inert gas protection. The system was then naturally cooled to obtain 28.0 g of lithium sulfide with a main content of 99.1%.

Step G (crushing and packaging): The high-purity lithium sulfide obtained after the heat treatment in step F above was crushed at 2000 r/min under an inert gas protection for 1 min to obtain a white anhydrous lithium sulfide powder, and then vacuum packaging was performed.

Example 2

Step A (solution mixing): Under an inert gas condition, 2 g of lithium chloride, 0.5 L of an n-butyllithium solution (2.5 mol/L) and 2.5 L of n-hexane were thoroughly mixed to obtain a mixed solution, and the obtained mixed solution was charged into a sealed container.

Step B (gas-liquid reaction): Under the sealed condition and at a temperature of 40° C., $H_2S$ gas was firstly introduced into a gas-washing bottle through a submerged pipe at a certain rate (10.5 L/h), and then introduced into the mixed solution through the submerged pipe. The resulting mixture was continuously stirred for reaction for 5 h, so that a reaction slurry was obtained.

Step C (filtering and rinsing): Under an inert gas condition, the slurry which was completely reacted was filtered with a G3 sand core funnel, and the crude lithium sulfide wet material was rinsed three times with 0.5 L of n-hexane.

Step D (dissolution and filtration): Under an inert gas condition, the upper slurry was taken out, and 0.75 L of n-hexane was added. The resulting mixture was stirred for 1.5 h, and then filtered with a G4 sand core funnel to obtain a refined lithium sulfide wet material.

Step E (vacuum drying): The obtained refined lithium sulfide wet material was placed into a vacuum drying oven and dried at 205° C. for 8 h. Finally, dried lithium sulfide was obtained.

Step F (heat treatment): The obtained dried lithium sulfide was placed into a vacuum-sealed stainless steel device. The device was vacuumized, and then placed into an atmosphere furnace at 550° C. followed by heat preservation for 3 h under an inert gas protection. The system was then naturally cooled to obtain 27.9 g of lithium sulfide with a main content of 99.2%.

Step G (crushing and packaging): The high-purity lithium sulfide obtained after the heat treatment in step F above was crushed at 2000 r/min under an inert gas protection for 1.5 min to obtain a white anhydrous lithium sulfide powder, and then vacuum packaging was performed.

Example 3

Step A (solution mixing): Under an inert gas condition, 2.5 g of lithium chloride, 0.5 L of an n-butyllithium solution (2.5 mol/L) and 2 L of n-hexane were thoroughly mixed, and then the resulting mixture was filtered with a G4 sand core funnel. Finally, a mixed solution was obtained, and the obtained mixed solution was charged into a sealed container.

Step B (gas-liquid reaction): Under the sealed condition and at a temperature of 35° C., $H_2S$ gas was firstly introduced into a gas-washing bottle through a submerged pipe at a certain rate (10.5 L/h), and then introduced into the mixed solution through the submerged pipe. The resulting mixture was continuously stirred for reaction for 6 h, so that a reaction slurry was obtained.

Step C (filtering and rinsing): Under an inert gas condition, the slurry which was completely reacted was filtered with a G3 sand core funnel, and the crude lithium sulfide wet material was rinsed three times with 0.5 L of dehydrated n-hexane.

Step D (dissolution and filtration): Under an inert gas condition, the upper slurry was taken out, and 1 L of pre-dehydrated NIP was added. The resulting mixture was stirred for 1 h, and then filtered with a G4 sand core funnel to obtain a refined lithium sulfide wet material.

Step E (vacuum drying): The obtained refined lithium sulfide wet material was placed into a vacuum drying oven and dried at 205° C. for 8 h. Finally, dried lithium sulfide was obtained.

Step F (heat treatment): The obtained dried lithium sulfide was placed into a vacuum-sealed stainless steel device. The device was vacuumized, and then placed into an atmosphere furnace at 550° C. followed by heat preservation for 4 h under an inert gas protection. The system was then naturally cooled to obtain 28.1 g of lithium sulfide with a main content of 99.1%.

Step G (crushing and packaging): The high-purity lithium sulfide obtained after the heat treatment in step F above was crushed at 2000 r/min under an inert gas protection for 2 min to obtain a white anhydrous lithium sulfide powder, and then vacuum packaging was performed.

The method for preparing high-purity lithium sulfide by using industrial-grade butyllithium disclosed herein is characterized in that the industrial-grade butyllithium is reacted with hydrogen sulfide in an n-hexane solution at a temperature of 25-40° C. under an inert condition. Lithium sulfide is precipitated as a white solid and separated by filtration and drying after the reaction is completed. No water and impurities are introduced in the whole reaction, and finally high-purity lithium sulfide can be obtained. The equation for the synthesis is as follows: $H_2S + 2C_4H_9Li \rightarrow Li_2S + 2C_4H_{10}$.

The method for preparing high-purity lithium sulfide by using industrial-grade butyllithium disclosed herein is characterized in that the obtained lithium sulfide has less impurities, high purity, small particle size of about 100 nm, and high crystallinity. The sulfide electrolyte prepared from the obtained lithium sulfide has a conductivity reaching the level of $10^{-3}$ S/cm, so it reaches the level of liquid commercial electrolyte and has good application prospects.

The specific reaction principle is that industrial-grade n-butyllithium contains many butene impurities, lithium sulfide is a strong electrolyte, and n-hexane is a non-polar solvent, so lithium sulfide is difficult to ionize free ions in n-hexane and therefore exists in the form of ion pairs. When the concentration of lithium sulfide reaches a certain concentration during the reaction, the formed ion pairs can be mutually attracted by electrostatic interaction between opposite charges to form large aggregates with a particle size within the scale range of colloid particles, resulting in a pseudo-thickening phenomenon. In this case, there are a large amount of butenes in the industrial-grade n-butyllithium, and the coexistence of lithium sulfide, n-hexane and butenes will induce the formation of gel, resulting in difficulty in stirring. After filtering and drying, a large amount of butenes will remain in the product and ultimately affect product quality. By adding lithium chloride, a strong electrolyte insoluble in n-hexane, on the one hand, a good nucleation effect can be achieved, improving the tap density of lithium sulfide and the filtration performance of slurry, and on the other hand, the pseudo-thickening phenomenon and the formation of colloid can be well avoided due to the addition of another strong electrolyte. Lithium chloride is soluble in NP but lithium sulfide is not soluble. Finally, lithium chloride is removed by dissolution and filtration to obtain refined lithium sulfide. The criteria for determination of reaction end point are as follows: after reacting for 4-6 h, 3-5 mL of the reaction slurry is taken under an inert gas condition, and 30-50 mL of n-hexane is added; the resulting mixture is homogeneously stirred and filtered with a G4 sand core funnel, and then phenolphthalein and a small amount of water are dropwise added to the obtained solution; because butyllithium is soluble in n-hexane, if the reaction of the whole system is completed, there will be no butyllithium in the reaction system; if the solution does not change color, it means that there is no butyllithium in the filtrate, and the whole reaction can be determined to be completed. After placing the dried lithium sulfide into an atmosphere furnace at 550° C. for heat treatment for 2 h, the crystallinity of the lithium sulfide can be improved, and the sulfide electrolyte prepared from the obtained lithium sulfide has higher conductivity.

The above description is only for the purpose of illustrating the specific examples of the present invention, and should not be construed as the protection scope of the present invention. Any equivalent variations and modifications made in accordance with the design spirit of the present invention shall fall within the protection scope of the present invention.

What is claimed is:

1. A method for preparing high-purity lithium sulfide by using industrial-grade butyllithium, comprising:

step A: under an inert gas condition, thoroughly mixing 1.5-2.5 g of lithium chloride, 0.5 L of an industrial-grade n-butyllithium solution (2.5 mol/L), and 1.5-2.5 L of n-hexane to obtain a mixed solution, and charging the obtained mixed solution into a sealed container;

step B: under the sealed condition, firstly introducing $H_2S$ gas into a gas-washing bottle through a submerged pipe at a rate of 10.5 L/h, then introducing into the mixed solution obtained in step A through the submerged pipe, controlling a reaction temperature at 25-40° C., and continuously stirring for reaction for 4-6 h to obtain a reaction slurry;

step C: under an inert gas condition, filtering the slurry obtained by the reaction in step B above with a G3 sand core funnel to obtain a crude lithium sulfide solid wet material, and rinsing the crude lithium sulfide wet material three times with 0.5 L of dehydrated n-hexane;

step D: under an inert gas condition, adding 0.5-1 L of pre-dehydrated NMP to the rinsed lithium sulfide wet material obtained in step C above, stirring for 1-2 h, and then filtering with a G3 sand core funnel to obtain a refined lithium sulfide wet material;

step E: placing the refined lithium sulfide wet material obtained in step D into a vacuum drying oven, drying in vacuum at 205° C. for 8 h to obtain dried lithium sulfide;

step F: placing the dried lithium sulfide obtained in step E into a vacuum-sealed stainless steel device, vacuumizing the device, placing the device into an atmosphere furnace at 550° C. followed by heat preservation for 2-4 h under an inert gas protection, and then naturally cooling to obtain high-purity lithium sulfide; and step G: crushing the high-purity lithium sulfide obtained after the heat treatment in step F above at 2000 r/min under an inert gas protection for 1-2 min to obtain a white anhydrous lithium sulfide powder, and performing vacuum packaging.

2. The method for preparing high-purity lithium sulfide by using industrial-grade butyllithium according to claim 1, wherein in step A, the butyllithium added is of industrial grade and has a concentration of 2.5 mol/L, and the n-hexane and the butyllithium are added in a volume ratio of (3-5):1.

3. The method for preparing high-purity lithium sulfide by using industrial-grade butyllithium according to claim 1, wherein in step B, $H_2S$ gas needs to be firstly introduced into the gas-washing bottle for purification, wherein the gas-washing bottle is charged with a mixed solution of lithium sulfide and n-hexane, and $H_2S$ gas is introduced at a rate of 10.5 L/h.

4. The method for preparing high-purity lithium sulfide by using industrial-grade butyllithium according to claim 1, wherein in step C, the n-hexane used for rinsing is subjected to a dehydration treatment in advance, the dehydrated n-hexane is ≤50 ppm, and the n-hexane and the butyllithium are used in a volume ratio of 1:1.

5. The method for preparing high-purity lithium sulfide by using industrial-grade butyllithium according to claim 1, wherein in step D, the NMP used for dissolution is subjected to a dehydration treatment, the dehydrated NMP is ≤100 ppm, and the NMP and the butyllithium are used in a volume ratio of (1-2):1.

6. The method for preparing high-purity lithium sulfide by using industrial-grade butyllithium according to claim 1, wherein the inert gas in step E and step F is argon or nitrogen.

* * * * *